United States Patent [19]

Motoki et al.

[11] 4,171,985
[45] Oct. 23, 1979

[54] FOAMABLE HEAT INSULATING COMPOSITIONS CONTAINING ALKALI SILICATE AND ALUMINA CEMENT

[75] Inventors: Hideo Motoki; Shigehiro Nagaretani, both of Ibaraki; Eiichi Tomita, Minoo, all of Japan

[73] Assignee: Shikoku Kaken Kogyo Kabushiki Kaisha, Osaka, Japan

[21] Appl. No.: 860,493

[22] Filed: Dec. 14, 1977

[30] Foreign Application Priority Data

Dec. 17, 1976 [JP] Japan .................. 51-153097

[51] Int. Cl.$^2$ .................. C04B 21/02; C04B 31/02; C04B 35/16; C04B 7/32
[52] U.S. Cl. .................. 106/40 R; 106/75; 106/76; 106/87; 106/104
[58] Field of Search .................. 106/75, 76, 87, 104, 106/40 R

[56] References Cited

U.S. PATENT DOCUMENTS

| | | | |
|---|---|---|---|
| 3,508,940 | 4/1970 | Webb et al. | 106/75 |
| 3,729,328 | 4/1973 | Madger | 106/87 |
| 4,057,608 | 11/1977 | Hashimoto et al. | 106/75 |

*Primary Examiner*—Delbert E. Gantz
*Assistant Examiner*—Mark Bell
*Attorney, Agent, or Firm*—Edwin E. Greigg

[57] ABSTRACT

A process for manufacturing inorganic heat insulating material by mixing up water-soluble alkali silicate, alumina cement, metal base foaming agent and foam stabilizing agent into pasty state under presence of water. The heat insulating material manufactured by this process is of the class useful for heat insulating walls of buildings and for heat insulating plates incorporated in machinery.

3 Claims, No Drawings

FOAMABLE HEAT INSULATING COMPOSITIONS CONTAINING ALKALI SILICATE AND ALUMINA CEMENT

BACKGROUND OF THE INVENTION

This invention relates to a process for manufacturing a novel inorganic heat insulating material, more particularly to a novel, useful process for stably yielding, in a short period of time, an inorganic heat insulating material containing uniform foams, which foams and hardens simply by mixing up the ingredients into pasty state, even without any heating operation.

There have conventionally been various proposals for obtaining inorganic foam materials based upon aqueous solution of alkali silicate. Among such known processes there are, for example, a process for foaming the solution by directly heating same, a process of first mixing to the solution a foaming agent as will give rise a gas upon heating and then getting the mixture to gel followed ultimately by foaming up the mixture gel by means of heating same, and a process of first mixing to the solution a hardening agent such for instance as silicofluoride followed by heating the mixture thus to hardening and foaming same. All such known processes essentially require heating (normally in the range of 200°–900° C.) for obtaining the foamed material. Namely, the alkali silicates and the foaming agents never cause foaming reaction at the normal temperature, and heating is indispensable for the foaming. It is yet more to be noted that the foamed product obtained by any of such processes contains water-soluble alkali components as will easily dissolve out upon contact with water thus for markedly impairing the structural strength of the foamed product, which has, therefore, very narrow scope of application as the heat insulating material, becuase of such low resistance to water by nature.

In the field of concrete and mortar, inorganic lightweight materials highly resistant to water and with high mechanical strength are conventionally known, for instance as lightweight concrete, lightweight mortar or the like, but most of them are made simply by incorporating proper lightweight aggregate such as perlite, vermiculite or the like. It is also a known process to mix metal aluminum and water with cement, to knead up the mixture and to submit the mixture under heat and pressure in an autoclave, thus for causing exothermic hydraulic reaction with simultaneous foaming by hydrogen gas generation, but this process requires troublesome operations as curing in the autoclave, and the time required for the foaming and hardening is very long, particularly the hardening normally requiring quite long as one whole week or so. It should further be noted that the various processes as mentioned above can hardly provide the foamed product sufficiently light in weight, the best lightweight conventional product having the density of more than 0.5 specific gravity.

The present invention has as its object to provide a novel process for manufacturing a useful inorganic heat insulating foamed material eliminating all the drawbacks of the conventional processes for manufacturing such material.

In order to attain the object, the process for manufacturing the inorganic heat insulating material according to this invention is characterized by mixing up into a pasty state, under presence of water, the ingredients comprising: (A) water-soluble alkali silicate (hereinafter referred to as ingredient A); (B) alumina cement (hereinafter referred to as ingredient B); (C) metal base foaming agent (hereinafter referred to as ingredient C); and (D) foam stabilizing agent (hereinafter referred to as ingredient D).

One of the most prominent features of this invention is to easily yield the desired heat insulating material under normal temperature and normal pressure simply by mixing up the said ingredients A–D into pasty state, even without any heating operation subsequent to the mixing. To note further, foaming reaction of the said mixture requires only short period of time, normally in the range of 5–60 minutes, which is defined almost definitely by the composition of the mixture, and subsequent hardening proceeds also rapidly, normally to complete within 24 hours. Furthermore, application of the mixture in pasty state as mentioned above allows use of the casing mould or frame almost in any complicated shape without causing difficulty, thus enabling to easily form the product in any design as desired. Foaming pressure of the paste is rather low, as will permit to use even corrugated paper board for the casting wall, thus requiring no specific casting frame of substantial strength, and the paste can be applied by pouring into the place desired to be heat insulated, simply with proper confinement walls. The pasty mixture according to this invention is further characterized by the excellent stability of the foaming reaction as is little influenced by the ambient conditions as climate or the like, and it provides the possibility of regulating the foaming reaction time, by properly regulating the composition ratio of the said ingedients A–D, which may thus be set and then kept almost uniform and constant to the desired value within the said possible range, and also of easily regulating the foaming overrun ratio, thus the bulk density of the product. With respect to the bulk density, in particular, extremely low density can hereby be provided, as in the range of about 0.1–0.3 $g/cm^3$ as has never been possible with respect to the conventional autclaved lightweight concrete, generally called ALC and known as with excellent mechanical strength; with this novel product of such low density still having sufficient mechanical strength for practical use as the heat insulating material. As a matter of course, here is no difficulty in manufacturing the product with similar bulk density and similar mechanical strength just as the said ALC, and such novel product can now be of half as low heat conductivity coefficient as compared with the ALC.

The inorganic heat insulating material provided by the process of this invention has the foams of substantially uniform diameters, in the possible range of 0.5–10 mm as the case may be, and the foam structure is very robust. This material has thus excellent heat insulation, noncombustibility, resistance to heat, and interception of fire flame. Especially, the heat resistance is quite excellent as is proved by the test of keeping the samples in a 700° C. furnace for 24 hours, resulting no appreciable deformation of the samples at all. Still more, this material according to this invention has remarkably excellent resistance to water, acid and alkali, as well as the mechanical strength, as are not realized by the conventional foamed alkali silicate material.

The reason why the novel inorganic heat-insulating material with the properties as mentioned above can be manufactured according to the process of this invention simply by mixing up the said ingedients A–D is not very clear as at this moment, but it might perhaps be as follows: Upon mixing up into the paste, most of the ingredient B, namely alumina cement (or the same together with portland cement), reacts upon water to gradually be hardened as hydraulic reaction, while a part of the ingredient A, namely water-soluble alkali silicate, as well as of the said ingredient B, undergoes hydrolysis in the paste to give alkaline agents, such as alkali hydroxides, and the groups such as $SiO_3^{2-}$ and $AlO_2^-$, with said alkaline agents then coacting with the ingredient C, namely metal base foaming agent, to promote the foaming action for generating the minute foams within the paste or the hardening ingredient B, and with said groups such as $SiO_3^{2-}$ gradually undergoing gellation in parallel with said foaming reaction, for being intimately packed up within the mass of the hardened ingredient B, thus resulting, according to this assumption, in improved mechanical strength of the foamed product as solidified. As for the ingredient D, namely the foam stabilizing agent, it is assumed that it will, while the hydraulic reaction of the ingredient B and the foaming reaction between the ingredients A/C and B/C proceed, keep the dispersion of the ingredient C uniform within the entire bulk in spite of its inclination to otherwise gradually be locally biased, thus securing the function for stabilizing the foaming reaction and preventing localization as well as serial continuation of the minute foams as generated. Be the matter what it may, this invention enables to stably and easily manufacture the inorganic heat insulating material with excellent characteristics, simply by mixing up the ingredients uniformly, under normal temperature and normal pressure, thus providing enormous industrial value.

DESCRIPTION OF THE PREFERRED EMBODIMENTS

In this invention, it is essential and indispensable to use soluble alkali silicate as the ingredient A, only herewith yielding the inorganic heat insulating material as expected. Such heat insulating material can not be made from insoluble or hardly or badly water-soluble alkali silicate, such as the common anhydride liquid glass cullet. As alkali metal to constitute this ingredient A, various examples may be mentioned such as Li, Na, Ka, Rb and so forth, among them especially preferable being Na, Ka etc., since such are available quite economically and yet remarkably promote the foaming function. So long as is water-soluble, the ingredient A puts no specific limitation as to the composition and the mol ratio between the metal oxide (represented as $R^I_2O$) and $SiO_2$, but the preferable range of the mol ratio $SiO_2/R^I_2O$ lies generally over 1.5–4.0, with the most preferable range being 1.8–3.0, since such range will yield the product heat insulating material especially good both in resistance to water and in mechanical strength. One kind of the ingredient A solely or two or more kinds combined may as well advantageously be used either in the form of powder or in the form of aqueous solution, but in view of convenience in preparing the paste, it is preferable to use same in the form of aqueous solution with the solid concentration of 20% or more, normally in the range of about 20–60%. Thus, when the ingredient A is used in the form of aqueous solution of the concentration in such range, the paste with proper flowability can then be easily prepared simply by admixing same with other ingredients B–D, and shrinkage coefficient for the hardening can comparatively be moderate.

The ingredient B is, as already mentioned, alumina cement which is a hydraulic cement containing CaO and $Al_2O_3$ as the main components thereof, and any one of those commercially available with various composition ratios may be used as this ingredient B in the present invention. The calcium aluminate component of the alumina cement may take the various forms such for instance as tri-calcium aluminate ($3CaO.Al_2O_3$), calcium aluminate ($CaO.Al_2O_3$), calcium di-aluminate ($CaO.2Al_2O_3$) and calcium hexa-aluminate ($CaO.6Al_2O_3$), and any one of them as shown in such composition formula can advantageously be used in this invention for realizing the effect as expected, which can however not be attained with other cement material than the alumina cement. Particularly preferable composition for the alumina cement is in the range of CaO in 36–59% and $Al_2O_3$ in 39–53%, with possibility of some harmless impurities as $Fe_2O_3$ in 1–16% and $SiO_2$ in 3–9%. Any one type of the said alumina cement alone or two or more types of them combined may as well be used, and it is preferable to use same in a powdery form normally in size under 100 micron mesh. In this invention, it is also possible to add a certain amount of portland cement to the said alumina cement, as the ingredient B. By portland cement it is meant normal type of cement containing calcium silicate as the main hydraulic component, and in the trade there are classifications of those commercially available such for instance as normal portland cement, rapid hardening portland cement, ultra rapid hardening portland cement and moderate heat portland cement, with some differences in the composition therebetween, and any portland cement may be used in this invention. Use of such portland cement, any one kind or two or more kinds, in a powdery form under about 100 micron size, in combination with the said alumina cement, has the effect of shortening the time required for hardening the paste of this invention, but too much dose will make the hardening too short and is apt to result in difficulty of good foaming. It is therefore preferable to use the portland cement in solid weight ratio of under 30 parts to 100 parts of alumina cement, most preferable range being further restricted to be under 20 parts, since such will yield the heat insulating material especially good in resistance to water.

As the ingredient C of this invention, it is possible to use various metal elements and metal alloys or intermetallic compounds. As the metal element, any member belonging to groups I B, II A, II B, III A, III B, IV A, IV B, V A, VB, VI B, VII B and VIII in the periodic table may be used, of which the elements belonging to the 3rd to 5th groups are preferable. Suitable metal elements may be mentioned by way of example as Mg, Ca, Cr, Mn, Fe, Co, Ni, Cu, Zn, Al, Ga, Sn, and Sb, of which the most preferable are Al, Mg, Fe, Ni, and Zn, in view of easy avilability and good reactivity. In this invention, semi-metallic elements such as B, Si etc. may as well be used just like the metallic elements mentioned above. Furthermore, alloys of the said metals or intermetallic compounds (compounds with chemical bonds in between metals or between metal and nonmetal) may also be used in this invention just like the said metals. By way of example, typical alloys or the intermetallic compounds may be shown as Al-Si, Al-Ti, Al-Mn, Al-Cu-Si, Al-Cu, Zn-S, Zn-Sn, Sn-Fe, Cu-Sn, Su-Si, Cu-Pb, Cu-Ni, Fe-Ni, Fe-Mn, Fe-Cr, Fe-Si, Mn-P, Si-Ni, Co-Sb and Mn-Ag. It is preferable to use the ingredient C, either one kind or two or more kinds, normally in a powdery form, especially under 150 micron size.

As the ingredient D of this invention, namely the foam stabilizing agent, it is possible to use an inorganic substance chosen from silica gel, zeolite, artificial zeolite, carbon black, active carbon, alumina gel, talc and mica, or an organic substance such as animal protein as conventionally known as foaming agent for cement bulk, dimethyl silicone derivative and so forth. The ingredient D as such has the function of keeping the dispersion of the ingredient C uniform within the entire bulk and stabilizing the foaming reaction, and is thus effective for generating minute, uniform foams. If the ingredient D is an inorganic substance, it is preferable to use same in a powdery form normally in size under 200 micron mesh. The composition ratios of the ingredients A-D may vary in accordance with what kind of substances compose each of the ingredients, concentration of the ingredient A when in particular the same is used in form of the aqueous solution, bulk density and strength of the product as desired, and casting condition for forming up the desired product; but the guideline may normally be as follows: Namely, taking the solid portion of the ingredient A as the basis, thus to 100 parts in weight thereof, the ingredient B may have the solid portion in the range of about 100-700 parts in weight, preferably 140-500 parts in weight, and the ingredient C may be in the range of about 0.5-35 parts in weight. As for the ingredient D, it may have the solid portion in the range of about 5-50 parts in weight if it is an inorganic substance, or about 0.1-3 parts in weight if organic. Generally speaking, presence of the ingredient A in too much excess tend to cause unstability of the foaming and of the bulk density, thus to yield the product heat insulating material with uneven foam dispersion and low resistance to water; while too much presence of the ingredient B tends to cause too high paste viscosity in the paste preparation, thus to lower the workability. As for the ingredient C, too small amount thereof will cause insufficient foaming thus to result in heavy bulk density (about 1.0 specific gravity or more), while too much amount thereof will cause excessive foaming in large bubbles within the product which is thus difficult to have the strength as desired. As for the ingredient D, supposing first the same is an inorganic substance, too small amount thereof will cause uneven foaming, while too much amount thereof will make the paste preparation difficult. In case the same is an organic substance, too much presence of such will cause serially continuous foams thus to result in low heat insulating effect.

In this invention, the ingredients A-D are mixed up under presence of water into pasty state, as mentioned already. No particular limitation is put to the method of the mixing, and it is possible to simply mix up the ingredients A-D together with proper amount of water all at one time, but it is advantageous, for ease of operation, to first mix in the predetermined ratios the ingredients B-D each having been kept in solid powdery state, and thereafter to admix such mixture into the ingredient A which is in the form of aqueous solution. As the ingredients B and C will start hardening and foaming reactions in a very short period of time after the mixing, these two ingredients are preferably added simultaneously to compose the paste in the preparation thereof. In this preparation of the paste by mixing up the ingredients A-D, it is preferable to use such proper amount of water as will ultimately result in that the ingredient A and total water in the paste is same as would make an aqueous solution of the ingredient A in concentration within the range of 20-60%, preferable 20-50%, based on such total solution weight, should these two have been mixed alone, and it is also preferable to make up the paste normally with agitation or the like thus to have the solid particles dispersed uniformly.

At all events, it is essential in this invention to mix up the ingredients A-D into pasty state under presence of water, since no sufficient foamed and hardened material will yield without such pasty state. It is here to be understood that the "paste" as so far referred to means a soft, viscous dispersion of solid particles, with the viscosity of the paste in this invention normally in the range of about 0.5-300 P at 25° C.

To the paste as prepared as above, it is possible to add, when needed, lightweight aggregate powder normally kilned over 1000° C., for instance as foam silica, perlite, vermiculite, SHIRASU-balloon (i.e. volcanic soil mainly in Kyushu, southern island of Japan, Kilned to form balloon-like particles), thus for further lowering the bulk density of the product. Yet more, it is also possible to further add, for the purpose of filling and increasing the volume and/or of reinforcement, various conventional fillers such as gypsum, fused quartz, sintered cristobalite, silica powder, fly ash, alumina powder and so forth, but care must then be paid as to the kind and volume of such fillers so that proper reaction mode of the said essential ingredients A-D should not be affected. Further, if gypsum is chosen, it secures the function for stabilizing the foaming reaction in addition to filling and increasing effects.

According to this invention, both the hardening and foaming reactions concurrently start immediately after the paste is prepared by mixing the ingredients A-D and, when needed, the lightweight aggregate powder or the like as well. Such concurrent reactions of hardening and foaming proceed quite well under normal temperature and normal pressure even without any external heating, normally to end in about 5-60 minutes, and the hardening reaction will be completed within 24 hours. No need of heating and pressure according to this invention as mentioned above is in industrial view point quite advantageous, but it should be noted that the foaming and hardening reactions proceed at the temperature in the range of about 5°-90° C., and it is possible, as a matter of course, to effect heating up to about 90° C., in such case as particular promotion of the reaction is desired. In normal application, temperature range from the normal temperature to about 50° C. is preferred.

In such manner, inorganic heat insulating material is obtained according to this invention, which contains uniform foams, in size normally in the range of 0.5-10 mm diameter and which is of low specific gravity and of high strength and is excellent in view of water absorption coefficient, freezing and thawing stability, resistance to water, resistance to chemicals, heat insulation, heat resistance, resistance to fire flame and so forth.

As the inorganic heat insulating material according to this invention has the various characteristics as mentioned heretofore, it may induce further novel advantages accordingly what the use may be. Mention is now given hereunder on some special examples of application, which are, of course, of no limitative nature:

Central heating system has widely been spreading in recent years as heating means for the residential houses, hotels, hospitals and so forth. There, the heat source is hot water and duct pipes for the hot water are installed within the floors and walls and occasionally in the ceilings as well. Conventional art widely used there is to apply a thermal conductor plate such as aluminium foil on the inner room side surface of such wall etc. containing the hot water pipe and to apply an exterior metal plate on the building outer side thereof, with hard polyurethane foam poured therebetween as stuffing and heat insulating material. However, the polyurethan foam, being an organic susbtance, is weak to overheating and high temperature steam, and has in addition the vital defect of flashing up or scorching in smoke when attacked by flame in case of fire. It is also the drawback that curing or aging in irregular deformation is apt to develop internally at the boundaries with the said thermal conductor plate and the exterior metal plate, thus causing often to contain dew water there.

Applying the inorganic heat insulating material according to this invention instead of such conventional hard polyurethane foam, its excellent resistance to fire, heat and flame will function for putting down fire hazard, should such occur, and the heat insulation effect itself is higher than with the polyurethane foam. Furthermore, it has good bonding characteristic to the thermal conductor plate and the metal plate, thus realizing good absorption of shock, and high working efficiency is attaned by the simple operation of pouring the paste.

As is evident, similar advantages are likewise seen also in use for heat insulating walls not incorporated in such central heating system. Walls of the buildings in general, with exception of concrete structure, often contains hollow space in their structure, as is quite common in view both of reducing the costs for the reinforcement steel skeletons as well as pre-fabricated structures and PC wires, and of enchancing the heat insulation. It is now possible to form up heat insulating walls by pouring the past, to make the heat insulating material according to this invention, into the said hollow space. The inventors have performed various experiments with this respect, and have got there quite unexpected findings. It concerns the experiments where pneumatic feed pouring system is used as means of supplying the heat insulating material of this invention to the wall structure, thus pouring same into the hollow space within the wall through an aperture of proper size, which results in uniform foam mass even when poured into a hollow space with a slit of about 50 mm wide, with quite excellent "rising-up property", i.e. the property of the foaming heat insulating material to heap up vertically with increasing bulk volume during the foaming step, which bulk volume overrun ratio and the rising up ratio being thus desired to be identical especially when the bottom area is confined to remain constant, and which reveals that such excellent rising up property is more prominent as the paste is poured more promptly after being mixed up. Generally speaking, width of the slit in the hollow space within building walls ranges from about 30 mm when narrow to 200 or 300 mm when broad, normally within the range of about 50–100 mm, and the height is, when modularized, under 5 m at the highest in view of the structural restriction, while width of the hollow space is less than 2 m. Assuming now a hollow wall with slit width 100 mm, hollow space width 1 m and height 3 m, such is just an example of "casting plates with hollow space therebetween". It has so far been considered to be quite difficult in the prior art to attain the 3 m rising up by pouring the conventional plastic foam, and the foaming reaction then results in foams lacking uniformity, thus with poor heat insulating effect. In such instance, however, pouring the paste of this invention by means of pneumatic supplying system immediately after mixing up thereof has given the results sufficient in view both of the rising up property and uniformity of the foams. It is possible, therefore, to easily form up the walls excellent in heat insulation, shock absorption and resistance to water, not only in the buildings under construction but also in the existing buildings, simply by pouring the paste of this invention through an aperture as may be drilled in the top portion of the part in question. Such building structure with hollow space may be of various materials such as concrete, mortar, asbestos cement board, wooden fiber cement board and so forth, and in the possible case of metal plate or plastics plate, i.e. the material with poor bonding property, there will even then be no serious hampering against formation of heat insulating wall according to this invention, if paper is applied beforehand on the working surface.

Among the various advantages over the foam plastics conventionally used for heat insulating walls, good bonding property should not be neglected. Making use of the good bonding action, it is possible to simply and easily perform the tiling work. It is conventional to form heat insulating tile walls by affixing tiles onto foam plastics surface thus to make use of the heat insulating function of the foam plastics. However, the foam plastics have rather poor bonding property themselves, and thus require good amount of adhesives. If the heat insulating material of this invention is used instead of such foam plastics for bonding tiles thereon, the working efficiency will then be improved with omission of adhesives, and additional effect of attaining excellent resistance to fire and to shock, as can never be expected with the foam plastics, may simultaneously be realized.

In order to more clearly visualize the invention, some examples are given hereunder, in which the ingredients A–D are chosen from those as listed in Tables 1–4:

Table 1

| | Ingredient A | | | |
|---|---|---|---|---|
| No. | Substance | Mol ratio $SiO_2/R'_2O$ | Concentration (%) | Remarks |
| A-1 | aqueous solution of natrium silicate | 2.0 | 20 | Made by Osaka Keisan Soda K.K |
| A-2 | aqueous solution of Kalium silicate | 3.0 | 30 | Made by Osaka Keisan Soda K.K. |
| A-3 | aqueous solution of lithium silicate | 2.2 | 50 | Reagent |
| A-4 | powder natrium silicate | 3.2 | 80 | A-1 dried and powdered to 40–150 micron mesh. |

Table 2

| | Ingredient B | | |
|---|---|---|---|
| No. | Article | Mol ratio $Al_2O_3/CaO$ | Mesh (micron) | Remarks |
| B-1 | DENKA High Alumina Cement | 1.57 | 5–100 | Made by The Electoro-Chemical Industrial Co., Ltd. |

Table 2-continued

| No. | Article | Ingredient B Mol ratio $Al_2O_3$/CaO | Mesh (micron) | Remarks |
|---|---|---|---|---|
| B-2 | DENKA High Alumina Cement II | 0.85 | 5–100 | Made by The Electoro-Chemical Industrial Co., Ltd. |
| B-3 | ASAHI Alumina Cement I | 0.78 | 5–100 | Made by Asahi Glass Company, Ltd. |

Table 3

| No. | Metal(s) | Ingredient C Mesh (micron) | Remarks |
|---|---|---|---|
| C-1 | Si | 1–50 | Reagent Extra Grade |
| C-2 | Ni | 1–100 | " |
| C-3 | Al | 1–50 | Powder for Paint, made by Toyo Aluminium K.K. |
| C-4 | Al—Cu | 5–100 | Reagent Extra Grade |
| C-5 | Fe—Si | 5–100 | " |

Table 4

| No. | Substance (Article) | Ingredient D Mesh (micron) | Remarks |
|---|---|---|---|
| D-1 | active carbon | 5–50 | Made by Taihei Chemical Industrial Corporation, Ltd. |
| D-2 | zeolite | 10–100 | Mined in North-Eastern region of Japan |
| D-3 | talc | 10–150 | Mined in Tajima region, Hyogo-Prefecture, Japan |
| D-4 | mica | 20–200 | Mined in North-Eastern region of Japan |
| D-5 | "Glufoam" | — | Animal protein for cement foaming, made by Sun-Orient Chemical Co., Ltd. |

Properties of the inorganic heat insulating materials obtained by the experiments have been tested and measured in accordance with the methods as follows, with the ambient testing condition uniformly maintained in 20±2° C. and 65±10% relative humidity:

(a) Bulk density: in accordance with JIS (Japanese Industrial Standard) A-1161
(b) Water absorption coefficient: Shown in % weight ratio, in accordance with JIS A-1161
(c) Compression strength: Shown in $Kg/cm^2$, in accordance with JIS A-1161
(d) Resistance to water: Judging outer appearance of the samples after soaking in water for 10 days, marked "—" if no change and "+" if any.
(e) Resistance to acid: Judging outer appearance of the samples after soaking in 1 N HCl for 2 days, marked "—" if no change and "+" if any.
(f) Resistance to alkali: Judged as to any change or not in outer appearance after soaking in saturated Ca(OH)$_2$ solution for 2 days.
(g) Thermal conductivity: Shown in kcal/m.hr.°C., in accordance with JIS R-2616
(h) Foam size: Shown in mm diameter, as measured with the foams appearing on cut surfaces of the samples
(i) Resistance to heat: Judging deformation of the samples after keeping in 650° C. furnace for 24 hours, marked "+" if any deformation and "—" if no. and
(j) Resistance to flame: Judging deformation of the samples after directly exposing to flame for 10 seconds, marked "+" if any deformation and "—" if no.

EXAMPLE 1

As the ingredient A, 100 grams of the aqueous solution A-1 were taken in a polyethylene continer (of 1.5 liter content). On the other hand, mixed powder was prepared by mixing up 100 grams of B-1, 5 grams of C-1 and 7 grams of D-1, as the ingredients B, C and D, respectively. Uniform paste was then made by adding the mixed powder into the polyethylene container keeping the ingredient A and admixing same by agitation under normal temperature. The paste, subsequently kept in the container, gradually started foaming and the foaming completed in about 50 minutes. Foaming occured to exceed the brim of the polyethylene container. Inorganic heat insulating material 1 according to this invention was obtained by letting same stand thereafter for one entire day thus completing the hardening. Shown in Table 5 are the results of the time (in minutes) required for the foaming for thusly obtaining the heat insulating material and of the properties thereof as measured.

EXAMPLES 2 and 3

Inorganic heat insulating materials 2 and 3 were provided similarly as in Example 1, with mere exception of changing the ingredient A from A-1 to A-2 and A-3, respectively. Shown also in Table 5 are the foaming time and the properties of the respective heat insulating materials as so provided.

EXAMPLE 4

Mixed powder was provided by taking 50 grams of powder A-4 as the ingredient A, 100 grams of B-1 as the ingredient B, 5 grams of C-1 as the ingredient C and 7 grams of D-1 as the ingredient D, into a polyethylene container and admixing same. To the mixed powder were then added 50 grams of water and made into uniform paste by amixing with agitation under normal temperature. The paste, subsequently kept in the container, gradually started foaming and the foaming completed in about 15 minutes after mixing and agitation with water. Foaming occured to exceed the brim of the polyethylene container. Inorganic heat insulating material 4 according to this invention was obtained by letting same stand thereafter for one entire day thus completing the hardening. Shown also in Table 5 are the foaming time and the properties of the heat insulating material as so provided.

Table 5

| Example (heat insulating material) No. | | 1 | 2 | 3 | 4 |
|---|---|---|---|---|---|
| Foaming time (minutes) | | 50 | 45 | 50 | 48 |
| Properties | (a) | 0.32 | 0.29 | 0.35 | 0.31 |
| | (b) | 0.2 | 0.3 | 0.3 | 0.2 |
| | (c) | 5.0 | 5.2 | 5.1 | 5.0 |
| | (d) | — | — | — | — |
| | (e) | — | — | — | — |
| | (f) | — | — | — | — |
| | (g) | 0.07 | 0.07 | 0.08 | 0.07 |
| | (h) | 2–4 | 1–3 | 2–4 | 2–4 |
| | (i) | — | — | — | — |
| | (j) | — | — | — | — |

EXAMPLES 5 to 8

Inorganic heat insulating materials 5 and 6 were provided similarly as in Example 1, with mere exception of changing the ingredient B from B-1 to B-2 and B-3, respectively.

Likewise, inorganic heat insulating materials 7 and 8 were provided again similarly as in Example 1, with mere exception of modifying the ingredient B by adding, to the said amount of B-1, 5 grams and 10 grams, respectively, of portland cement as commercially available (made by Nihon Cement Co., Ltd., in the range of 30–75 micron mesh). Shown hereunder in Table 6 are the properties and the foaming time of the respective heat insulating materials as so provided.

Table 6

| Example (heat insulating material) No. | | 5 | 6 | 7 | 8 |
|---|---|---|---|---|---|
| Foaming time (minutes) | | 35 | 30 | 15 | 10 |
| Properties | (a) | 0.30 | 0.25 | 0.27 | 0.24 |
| | (b) | 0.2 | 0.3 | 0.2 | 0.3 |
| | (c) | 4.8 | 5.0 | 4.8 | 5.1 |
| | (d) | — | — | — | — |
| | (e) | — | — | — | — |
| | (f) | — | — | — | — |
| | (g) | 0.06 | 0.07 | 0.06 | 0.08 |
| | (h) | 1–3 | 2–3 | 1–3 | 2–4 |
| | (i) | — | — | — | — |
| | (j) | — | — | — | — |

EXAMPLES 9 to 12

Inorganic heat insulating materials 9 through 12 were provided again similarly as in Example 1, with mere exception of changing the ingredient C from C-1 to 5 grams of C-2 through C-5, respectively. Shown hereunder in Table 7 are the properties and the foaming time of the respective heat insulating materials as so provided.

Table 7

| Example (heat insulating Material) No. | | 9 | 10 | 11 | 12 |
|---|---|---|---|---|---|
| Foaming time (minutes) | | 48 | 51 | 45 | 47 |
| Properties | (a) | 0.24 | 0.30 | 0.29 | 0.25 |
| | (b) | 0.3 | 0.4 | 0.2 | 0.3 |
| | (c) | 5.3 | 5.7 | 5.6 | 5.5 |
| | (d) | — | — | — | — |
| | (e) | — | — | — | — |
| | (f) | — | — | — | — |
| | (g) | 0.07 | 0.06 | 0.05 | 0.07 |
| | (h) | 1–3 | 2–5 | 2–4 | 1–3 |
| | (i) | — | — | — | — |
| | (j) | — | — | — | — |

EXAMPLES 13 to 16

Inorganic heat insulating materials 13 through 16 were provided again similarly as in Example 1, with mere exception of changing the ingredient D from D-1 to 7 grams of D-2 through D-5, respectively. Shown hereunder in Table 8 are the results of the properties and the foaming time, as measured, of the respective heat insulating materials as so provided.

Table 8

| Example (heat insulating material) No. | | 13 | 14 | 15 | 16 |
|---|---|---|---|---|---|
| Foaming time (minutes) | | 49 | 47 | 50 | 51 |
| Properties | (a) | 0.31 | 0.33 | 0.29 | 0.28 |
| | (b) | 0.3 | 0.4 | 0.2 | 0.3 |
| | (c) | 5.5 | 4.9 | 4.9 | 5.0 |
| | (d) | — | — | — | — |
| | (e) | — | — | — | — |
| | (f) | — | — | — | — |
| | (g) | 0.08 | 0.07 | 0.05 | 0.07 |
| | (h) | 1–3 | 2–4 | 3–4 | 1–3 |
| | (i) | — | — | — | — |
| | (j) | — | — | — | — |

EXAMPLES 17 to 19

Inorganic heat insulating materials 17 to 19 were provided again similarly as in Example 1, but with further incorporation, as fillers, of 2 grams of fused quartz, sintered cristobalite and gypsum, respectively, in addition to the ingredients A–D as originally used. Shown hereunder in Table 9 are the results of the properties and the foaming time, as measured, of the respective heat insulating materials as so provided.

Table 9

| Example (heat insulating material) No. | | 17 | 18 | 19 |
|---|---|---|---|---|
| Filler | | fused quartz | sintered cristobalite | gypsum |
| Foaming time (minutes) | | 45 | 45 | 45 |
| Properties | (a) | 0.29 | 0.25 | 0.25 |
| | (b) | 0.2 | 0.3 | 0.2 |
| | (c) | 6.2 | 6.3 | 6.3 |
| | (d) | — | — | — |
| | (e) | — | — | — |
| | (f) | — | — | — |
| | (g) | 0.06 | 0.07 | 0.06 |
| | (h) | 2–4 | 1–3 | 2–4 |
| | (i) | — | — | — |
| | (j) | — | — | — |

We claim:

1. A composition capable of being foamed upon mixing with water and capable of being cured into a heat insulating material at normal temperatures comprising A, B, C and D, wherein A is a water-soluble alkali silicate having a mol ratio $SiO_2/R^I_2O$, with $R^I$ representing alkali metal, of 1.5–4.0;

B is alumina cement;

C is a metallic or semi-metallic elemental foaming agent belonging to periods IB, IIA, IIB, IIIA, IIIB, IVA, IVB, VA, VB, VIB, VIIB and VIII in the periodic table, an alloy or an intermetallic compound of the said metals; and D is foam stabilizing agent selected from the consisting of silica gel, zeolite, artificial zeolite, carbon black, active carbon, alumina gel, talc, mica, animal protein and dimethyl silicone derivatives; and the solid portion of the ingredient B comprises 100–700 weight parts; the ingredient C comprises 0.5–35 weight parts and the ingredient D comprises 0.1–50 weight parts all based on 100 weight parts of A.

2. The composition of claim 1, wherein the ingredient B includes portland cement in a ratio of under 20 to 100 weight parts by weight based on the alumina cement.

3. The composition of claim 1, wherein the ingredient A is in the form of an aqueous solution having a concentration of 20 to 60%.

* * * * *